United States Patent [19]

Lacher, Jr. et al.

[11] 3,975,952

[45] Aug. 24, 1976

[54] ENGINE POWER OUTPUT MEASURING INSTRUMENT

[75] Inventors: Thomas F. Lacher, Jr., Peoria; Russel W. Grob, Metamora; William J. Gardner, Pekin, all of Ill.

[73] Assignee: Caterpillar Tractor Co., Peoria, Ill.

[22] Filed: Sept. 29, 1975

[21] Appl. No.: 617,920

[52] U.S. Cl................................ 73/117.3; 73/114
[51] Int. Cl.²........................................ G01M 15/00
[58] Field of Search.................. 73/116, 117.3, 114, 73/113; 235/150.21

[56] References Cited
UNITED STATES PATENTS

| | | | |
|---|---|---|---|
| 3,722,265 | 3/1973 | Metz et al............................ | 73/117.3 |
| 3,802,256 | 4/1974 | Formwalt.............................. | 73/113 |
| 3,890,832 | 6/1975 | Nick et al............................. | 73/116 |

Primary Examiner—Jerry W. Myracle
Attorney, Agent, or Firm—Phillips, Moore, Weissenberger, Lempio & Strabala

[57] ABSTRACT

A special-purpose computer instrument is coupled to an engine through a digitizing flow meter which measures fuel consumption, a digitizing tachometer which detects engine speed and a device for signaling if the load on the engine should vary. Utilizing this electrical input data, the instrument calculates and displays engine power output by multiplying the known Specific Fuel Consumption factor (e.g., pounds of fuel per brake horsepower per hour) for the particular engine model by the time required to consume a predetermined quantity of fuel and by correction factors for units and fuel density if necessary. To minimize test time and to simplify test operations, the instrument performs computations other than division by measured test time prior to completion of the fuel consumption time measurement and then senses completion of the time measurement and automatically performs the final portion of the computation. The instrument may also display engine RPM.

15 Claims, 4 Drawing Figures

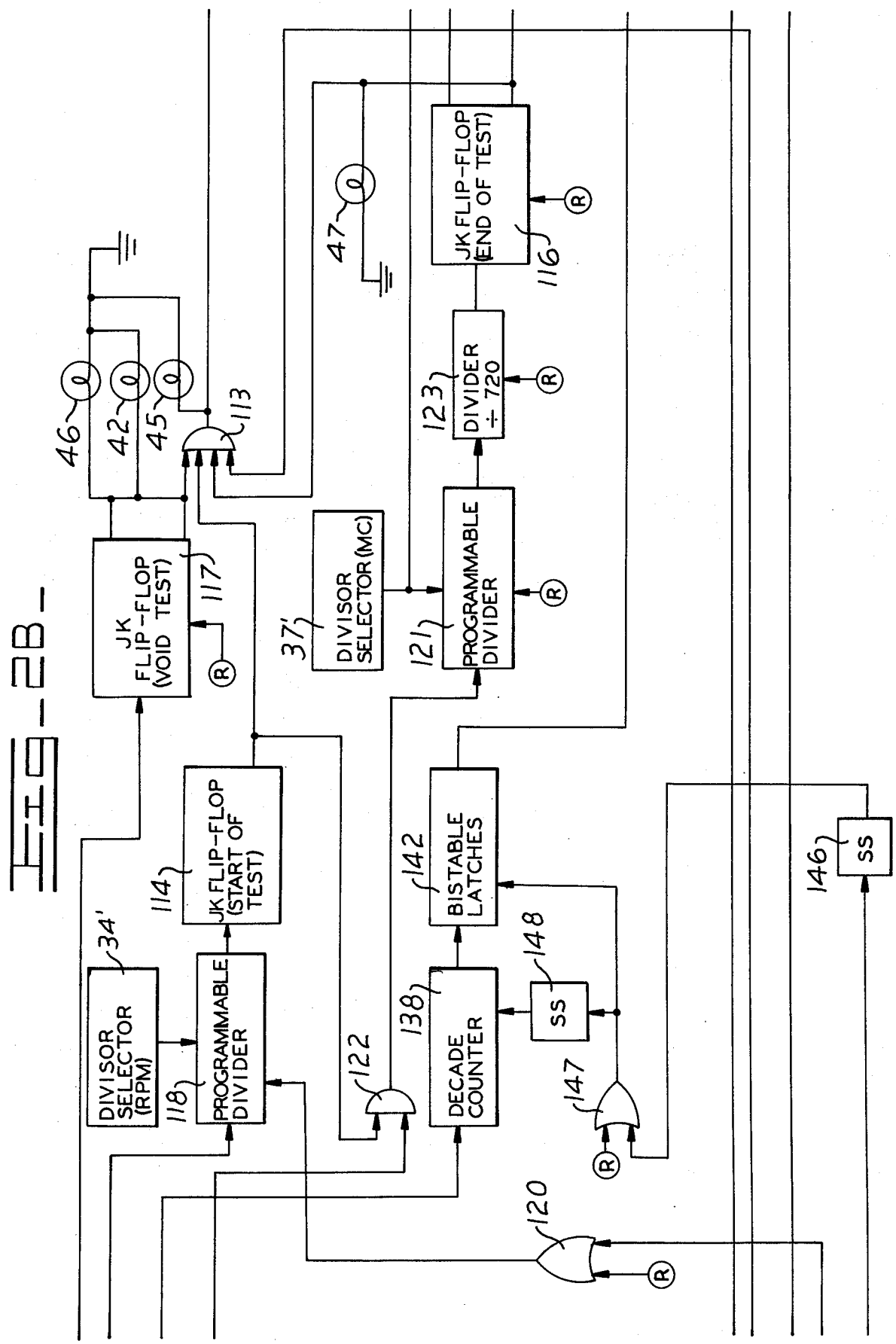

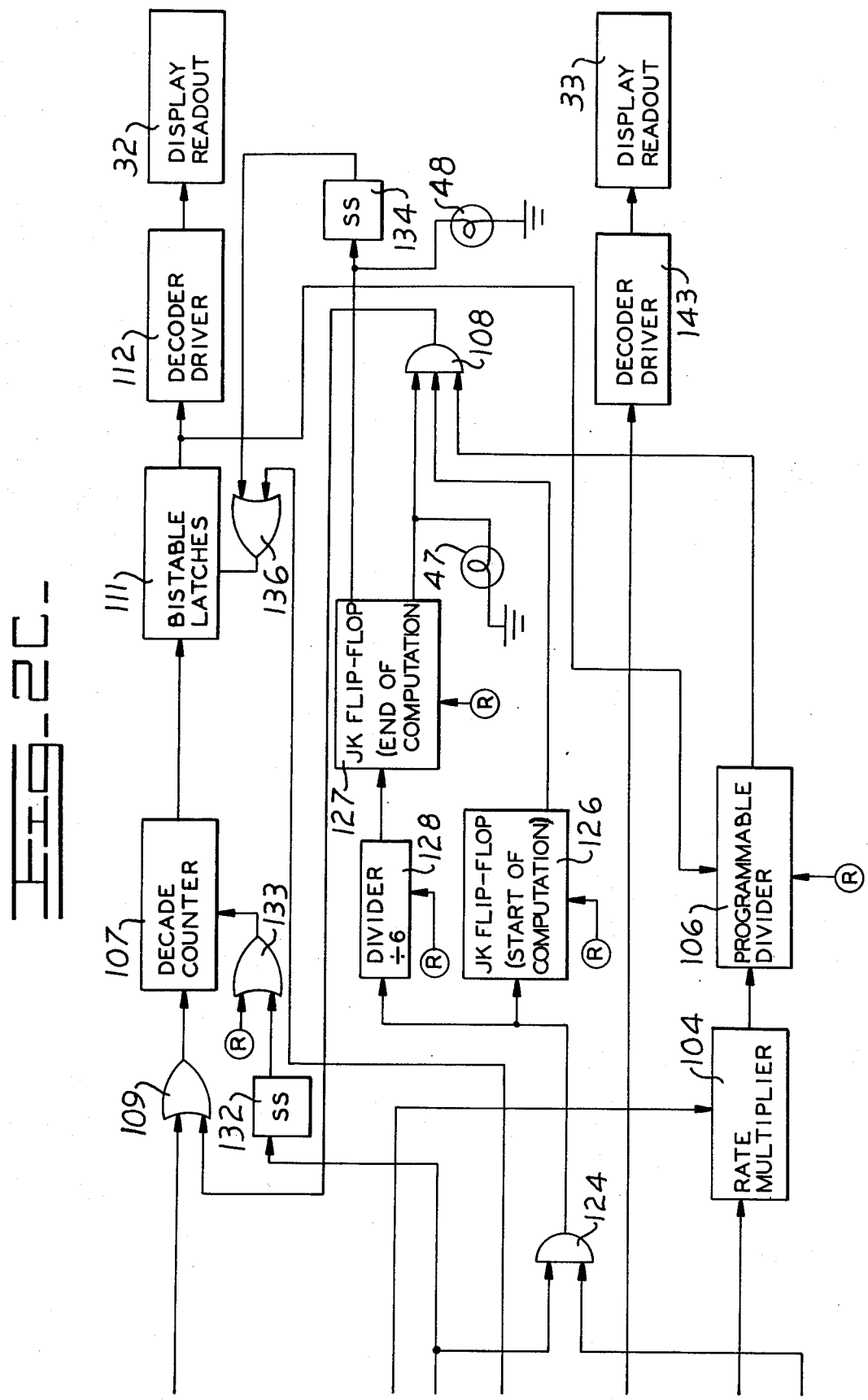

ENGINE POWER OUTPUT MEASURING INSTRUMENT

BACKGROUND OF THE INVENTION

This invention relates to instruments for testing engine performance and more particularly to devices for measuring and indicating the power output of engines.

Prior copending application Ser. No. 135,300 of Albert B. Niles et al, filed Apr. 19, 1971 and entitled METHOD AND APPARATUS FOR CHECKING ENGINE PERFORMANCE, discloses a system for rapidly and accurately measuring the power output of an engine without necessarily removing the engine from a vehicle or other working context. Prior to the system of the above-identified copending application, highly accurate power measurements required removal of an engine from a vehicle or the like in order that it might be mounted in a complex engine stand dynamometer. Other available instruments, such as a chassis dynamometer, did not require removal of the engine from the vehicle but were inherently less accurate. A chassis dynamometer is coupled to the vehicle wheels and thus does not measure power output at the engine itself but instead measures power as diluted in a variable and unknown manner in the engine transmission and other drive line components.

Virtually all specific engine models have a known Specific Fuel Consumption factor which is defined as the weight of standard fuel consumed per unit power output per unit of time. If expressed in terms of pounds of fuel per brake horsepower per hour this factor is known as the Brake Specific Fuel Consumption. Although this factor varies somewhat at different engine speeds in a given model of engine, manufacturers customarily publish tables or graphs showing the Brake Specific Fuel Consumption factor at different speeds for each engine model. Basically, the power measurement system of copening applicaton Ser. No. 135,300 operates by measuring the rate of fuel consumption of the engine under test at a predetermined speed and at constant loading and then multiplies this rate by the known Brake Specific Fuel Consumption factor for that engine at the predetermined speed and by units and fuel density correction factors if necessary. The result is the brake horsepower output of the engine.

In order for the test to be accurate, the engine must first be checked to assure that various malfunctions such as improper timing or compression, localized or generalized overheating and the like are absent. In the absence of these readily detectable malfunctions, it may be reliably assumed that any deviation of the power output of the engine from the standardized known power output of such engines as manufactured must be traceable to a variation of the rate of fuel flow into the engine. In other words, any specific model of engine in proper working order converts a known percentage of the latent energy of incoming fuel into kinetic energy at the engine output. Accordingly, once it has been determined that the engine is in proper working order in conformance with the manufacturer's specifications, power output can be reliably computed from fuel input.

In order to simplify and facilitate engine power measurements by this technique, prior copening application Ser. No. 135,300 discloses a compact portable computer-like instrument which may be temporarily coupled to an engine to be tested by installing a digitizing flowmeter in the engine fuel lines and by attaching a digitizing tachometer to a rotary component of the engine. The Brake Specific Fuel Consumption factor for the engine model may be dialed into the instrument and the test may be started by operating a switch. The instrument then clocks the time required to consume a predetermined quantity of fuel in the engine and displays this time at a read-out window. The operator then manipulates another switch and the instrument performs the necessary computations as discussed above and ultimately displays the calculated horsepower output of the engine at the read-out window. Prior U.S. Pat. No. 3,722,265 also discloses a basically similar power measurement instrument.

SUMMARY OF THE INVENTION

The invention is an instrument which computes the output power of an engine from electrical signals, indicative of fuel consumption rate and engine speed, more rapidly and conveniently than has heretofore been the case. In a preferred form the instrument may also separately display an engine speed value to facilitate the test and to facilitate engine problem diagnosis in general.

The invention includes a compact special-purpose computer which may be calculations prior coupled to an engine to be tested through a digitizing fuel flowmeter and a digitizing tachometer and, in most cases, through a device for electrically signaling if the load on the engine should vary during the test period. The instrument includes means by which the known Specific Fuel Consumption factor for the particular engine model at the test speed may be programmed into the computer so that the measured fuel consumption rate may be multiplied by the Specific Fuel Consumption factor to calculate and display horsepower following actuation of switch means for initiating the test. In contrast to prior devices of this general type, the instrument performs much of the necessary calculatons prior to the time that the test of fuel consumption rate is completed. The instrument detects when the time to consume a predetermined amount of fuel has been determined and then performs the final part of the computation to quickly give the desired read-out of engine power output.

Accordingly it is an object of this invention to shorten and simplify operations required for measuring the power output of an engine on the basis of fuel consumption rate.

The invention, together with further objects and advantages thereof, will best be understood by reference to the following description of a preferred embodiment taken in conjunction with the accompanying drawings.

DESCRIPTION OF A PREFERRED EMBODIMENT

Figure 1:
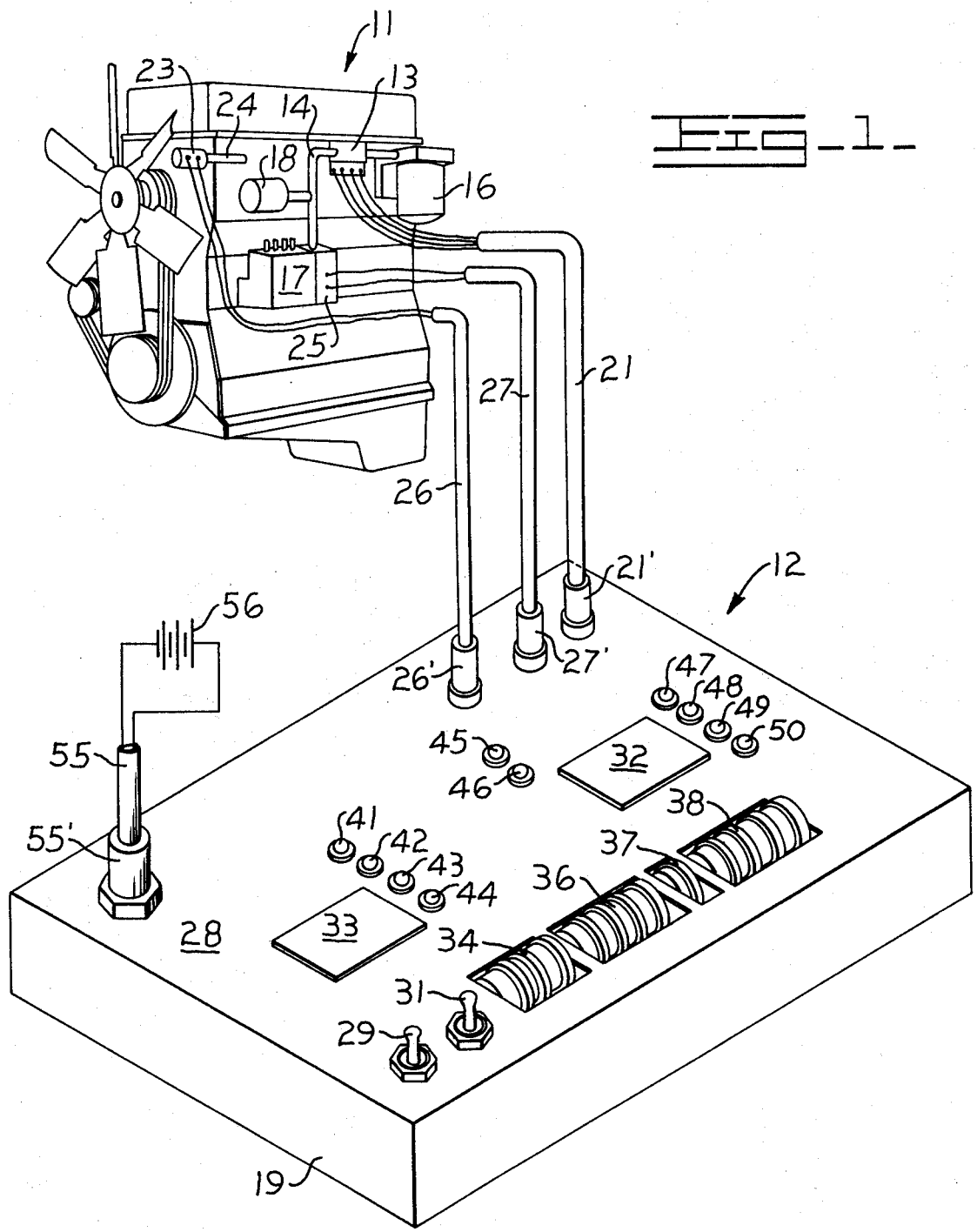
FIG. 1 is a perspective view of a typical engine to be tested and of a power-measuring instrument shown coupled to the engine, and FIGS. 2A, 2B and 2C, which may be juxtaposed end to end to form a single continuous figure, constitute a diagram of the internal circuits of the power-measuring instrumentation of FIG. 1.

Referring initially to FIG. 1 there is shown a typical vehicle engine 11 which in this instance is of the oil-fueled diesel form although the invention is equally applicable to gasoline engines or others which consume a fluid fuel. Engine 11 may be of conventional construction although certain temporary additions are made to the engine for the purpose of coupling the horsepower-measuring instrument 12 to the engine during the test period.

These temporary engine modifications include the installation of a digitizing flowmeter 13 into the fuel line 14 of the engine, in this instance between the fuel filter 16 and fuel pump 17. An accumulator 18 may also advantageously be coupled to fuel line 14 to dampen pressure pulsations as these tend to adversely affect the accuracy of flowmeters 13. Digitizing flowmeter 13, which may be of the known form that produces an electrical output pulse each time that a predetermined quantity of liquid passes through the meter, is electrically coupled to the housing 19 of instrument 12 through a four-conductor electrical cable 21, the specific circuit connections between the flowmeter and the instrument being hereinafter described in more detail.

Additional temporary installations on the engine 11 include the coupling of a tachometer 23 to a rotating element of the engine such as the camshaft 24, for example. This is not usually a difficult operation as most engines are manufactured with provisions to facilitate attachment of a tachometer. Tachometer 22 may be of the known digitizing form that produces electrical pulses having a frequency proportional to engine speed and is coupled to the instrument 12 through a two-conductor cable 26.

Accuracy of a power measurement using the instrument 12 is adversely affected if the load driven by engine 11 should vary appreciably during the period that fuel consumption rate is being measured. To signal a variation of loading, an additional two-conductor cable 27 may connect the instrument with the engine speed governor 25, the means for generating the signal at the governor being hereinafter described.

For convenience in carrying the instrumentation and for convenience in setting up a test, the several electrical cables 21, 26 and 27 are preferably coupled to the instrument housing 19 through separable connectors 21', 26' and 27' respectively.

Instrument housing 19 has a console face 28 at which manually actuated controls and indicator means are disposed. These include a two-position On-Off switch 29 and a two-position reset or Start Test switch 31, the functions of which will be hereinafter described in connection with the electrical circuit of the instrument. Console face 28 includes a first neon numerical read-out window 32 at which the horsepower evaluation is displayed at the conclusion of the test and a second neon numerical read-out window 33 which displays engine speed.

To enable the operator to dial in a predetermined engine speed at which the test is to be conducted, a three-digit thumb wheel programming switch 34 is mounted at console face 28. A second thumb wheel programming switch 36 provides for programming in a meter standard factor which adjusts for the different flow capacities of different-sized flowmeters 13 which may be used on different-sized engines, the thumb wheel switch 36 being of four-digit capacity in this example. An additional, single-digit, thumb wheel programming switch 37 may be set by the operator to select the number of full revolutions of the flowmeter 13 to be used in performance of the test. A final thumb wheel switch 38, of four-digit capacity in this example, enables the operator to program in the Brake Specific Fuel Consumption factor for the particular model of engine which is being tested.

To visibly indicate conditions within the instrument, console face 28 supports a first series of indicator lamps 41 to 46 which respectively indicate Ready-to-Test, Engine at Full Load, RPM being displayed, Meter Signal present, Test in Progress and Rack Open-Test Void due to load variation. The significance of these visible signals and the electrical connections to the indicator lamps will be hereinafter discussed.

A second series of indicator lamps 47 and 48 at console face 28 respectively indicate whether read-out window 32 is currently displaying the elapsed seconds of test period or engine horsepower output.

The instrument 12 requires a DC power supply which may be a battery self-contained within the instrument housing or an external power supply. In the present example, the battery 56 of the vehicle associated with engine 11 is utilized through a two-conductor cable 55 which connects with housing 19 through a disengageable connector 55'.

Figure 2A:
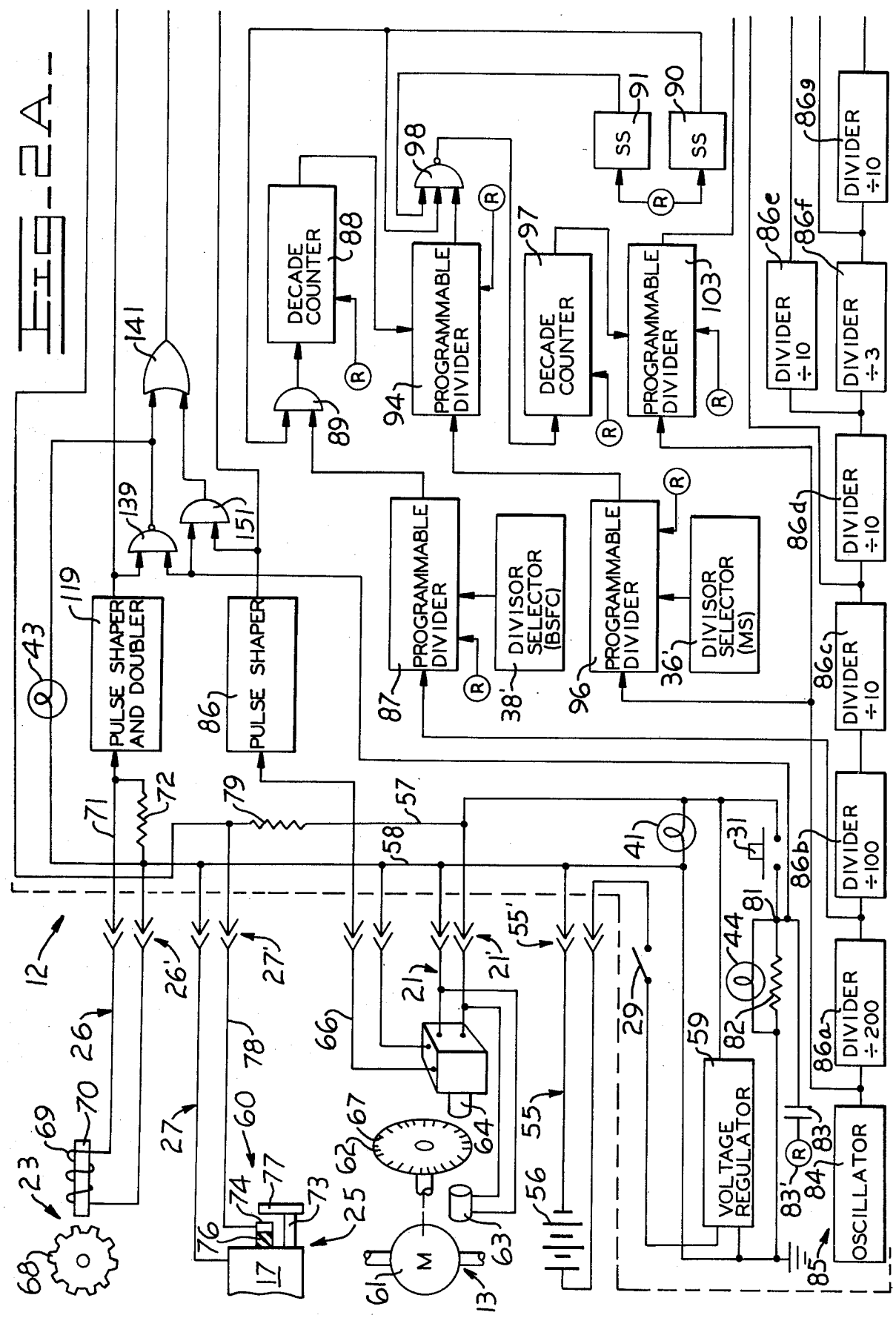

Referring now to FIG. 2A, the positive side of battery 56 is coupled to a B+ conductor 57 through the previously described On-Off switch 29 and a voltage regulator 59. The negative side of the battery is connected to a circuit ground conductor 58. Battery 56, in this example, provides operating current to flowmeter 13, and load signal means 60, as well as powering the internal components of the instrument housing. Voltage regulator 59 assures that a constant predetermined operating voltage is present at B+ conductor 57. To visually indicate when the instrument is energized, Ready-to-Test indicator lamp 41 may be connected across the B+ and ground conductors.

Principal components of a typical digitizing flowmeter 13 include a fluid motor 61, of the radial piston type for example, which is driven by the fuel flow into the engine and which in turn drives a rotatable disc 62. Disc 62 is positioned to inercept the optical path between a light source 63 and a photoelectric device 64 of the type which produces an electrical voltage signal on an output conductor 66 in response to ambient light. Disc 62 has a series of angularly spaced radial slits 67 which periodically allow light from source 63 to reach the photo-sensitive device 64 as the disc rotates. Accordingly, device 64 produces a train of fuel pulses on conductor 66 which has a frequency proportional to the speed of rotation of the disc 62. Each such pulse is indicative of the consumption of a predetermined amount of fuel at the engine. By counting the time required for predetermined number of these pulses to be generated, it is possible to determine the time required for a predetermined amount of fuel to be consumed by the engine.

A digitizing tachometer 23 may typically include a toothed wheel 68 which turns at a rate proportional to engine speed and which is formed of ferromagnetic material such as iron. A permanent magnet 70 is disposed with one end adjacent toothed wheel 68 and a coil 69 is wrapped around the magnet and has one end connected to ground conductor 58 through cable 26 and the other end connected to an engine speed pulse conductor 71 which is in turn connected to the ground conductor through a resistor 72. The teeth on the turning wheel 68 cyclically perturb the magnetic field of magnet 70 causing a sequence of electrical pulses to be developed across resistor 72, the frequency of the pulses being proportional to the speed of the engine 11.

Considering now the load signal means 60 at engine speed governor 25, variations of the load on an engine equipped with a governor result in movement of a rack 73 element. The rack 73 of the governor shifts to increase or decrease fuel input in order to maintain a preselected engine speed. For the present purposes, an electrically conductive stop element 74 is secured to the governor 25 through an insulator 76 in position to be contacted by a conductive portion 77 of the rack 73 when the rack is at a predetermined position. This is normally the rack position indicative of maximum rated load for the engine since the Specific Fuel Consumption factor of engines is usually originally ascertained with the engine operating at full load. The governor 25, including portion 77, is connected to ground conductor 58 through one of the conductors of cable 27. The other conductor 78 of the cable constitutes a load signal conductor and is connected to stop element 74 and also to B+ conductor 57 through a resistor 79. Thus, if the engine is operating at full load, portion 77 of the rack grounds stop element 74 to eliminate any significant voltage from load signal conductor 78. If the load on the engine should vary appreciably during a test, rack portion 77 moves out of contact with stop element 74 as the governor compensates for the load change. This ungrounds stop element 74 and a voltage builds up on conductor 78 through resistor 79 signaling that a load change has occurred.

Accordingly, with the On-Off switch 29 of the testing instrument closed, and with the engine operating, a series of electrical fuel pulses appear on conductor 66 at a rate proportional to fuel consumption in the engine. Simultaneously engine speed pulses are generated on conductor 71 at a rate proportional to engine speed. No voltage is present on load signal conductor 78 if the load on the engine remains substantially constant at a predetermined value but a voltage appears on conductor 78 if there should be a significant variation in engine loading. This electrical signal data on conductors 66, 71 and 78 is utilized by instrument 12 to calculate engine power output following a momentary closing of the Reset switch 31.

Considering now the circuit of the instrument 12 which calculates and displays power output, several circuit components such as counters, latching circuits, dividers and the like which will be hereinafter described, are devices which require an electrical reset pulse prior to each new power measurement as such devices store information and must be cleared to begin a new cycle of operation. To provide a reset pulse to such devices, switch 31 is connected between B+ conductor 57 and ground conductor 58 in series with a circuit junction 81 and a resistor 82. Upon closing of the Reset or Start Test switch 31, voltage appears at cicuit junction 81. A capacitor 83 is connected between junction 81 and the reset signal terminals of all counters, dividers, latching circuits and other components that need resetting and which will be hereinafter described. To avoid excessive complication in the drawings, the connections from capacitor 83 to the reset terminals of such devices are not depicted in FIGS. 2A, 2B and 2C but are instead represented symbolically by an encircled letter "R". Each encircled letter "R" should be understood to constitute an electrically conductive connection to junction 81 through capacitor 83.

A timing pulse source 85 provides timing or clock pulses for measuring the period required for consumption of a predetermined amount of fuel in the engine and for other purposes to be described. Source 85 includes an oscillator 84 having an output coupled to a series sequence of five pulse frequency dividers 86a to 86e. In the present example of the invention, oscillator 84 has an output frequency of 20 MHZ. Divider 86a therefore produces an output frequency of 100,000 HZ; divider 86b has an output frequency of 1,000 HZ; divider 86c has an output frequency of 100 HZ; divider 86d has an output frequency of 10 HZ and divider 86e has an output frequency of 1 HZ. To provide additional timing pulses for purposes to be hereinafter described, the output of divider 86d is also transmitted to a divide-by-three divider 86f which produces a 3⅓ HZ frequency and which is in turn coupled to still another decade divider 86g which produces a ⅓ HZ output.

Considering now the computation circuit components, with reference to FIGS. 2A, 2B and 2C in conjunction, the power output of the engine at a given speed is proportional to the Specific Fuel Consumption factor for the particular engine model at that speed multiplied by the rate of fuel consumption. This product must be further multiplied by a fuel density correction factor if the test is conducted with other than the manufacturer's specified fuel at specified temperature and pressure. The product may also have to be multiplied by a units correction factor to obtain the power evaluation in a preferred units system. In the United States of America at this time it is customary to express engine power in the nonmetric Brake Horsepower units system and accordingly the present example of the invention is adapted to read-out power in such units, it being apparent that the instrument may be adapted to read out in other power units by changing a constant of proportionality.

Mathematically, fuel consumption rate is expressable in terms of a quantity of fuel divided by the time required to consume that quantity of fuel. In the present instrument, the quantity of fuel to be consumed in the course of a test is selected in advance. Therefore, the variable to be measured is the time, hereinafter referred to as (TT) for Test Time, that is required to consume that known quantity of fuel. The known quantity of fuel may be expressed as (MS) × (MC) where (MS) or Meter Standard is the amount of fuel transmitted through meter 13 during each meter revolution and (MC) or Meter Cycles is the preselected number of meter revolutions to be employed in the course of the test.

Thus the equation to be solved by instrument 12 in the course of a measurement of Brake Horsepower (BHP) is:

$$BHP = \frac{K(MS)(MC)}{(BSFC)(TT)}$$

where $K$ is the units correction factor.

It may be seen that all of the terms in the above-identified equation with the exception of (TT) are known at the start of a test. The (TT) term or the time required to consume a known amount of fuel must be measured by the instrument during the test. In order to reduce the time required for conducting a test, the present invention performs most of the calculations required for solving the above-identified equation immediately after the test is first initiated by operation of the Reset switch 31 and before the test time is evaluated. The results of this precomputation are temporarily retained and then the final division by test time is performed when the (TT) term becomes available in order to display the calculated horsepower at read-out window 32.

In order to perform the precomputation, the output of timing pulse source divider 86a, 100,000 HZ in this example, is transmitted to the input of a programmable divider 87. The divisor selector 38' for divider 87 is controlled by the previously described BSFC factor thumb wheel switch 38 into which the Brake Specific Fuel Consumption for the engine has been set. Accordingly, when the Reset switch 31 is operated programmable divider 87 is reset to a count of zero and then proceeds to divide the 100,000 HZ input frequency by the BSFC factor of the engine undergoing test. The output of divider 87 is thus a pulse train having a frequency equal to 100 KHZ divided by the engine BSFC. This output frequency is transmitted to a decade counter 88 through an AND gate 89 for a predetermined period which is one second in this example. Gate 89 has one input coupled to the output of divider 87 and has another input coupled to the output of a monostable multi-vibrator circuit 90 which has a period of one second. Monostable multi-vibrator 90 has a trigger input coupled to reset pulse source 83'. Thus following operation of the Reset switch 31, gate 89 is enabled for a period of one second and decade counter 88 receives and stores a count equal to 100 KHZ divided by the Brake Specific Fuel Consumption factor of the engine undergoing test.

The output of counter 88 is coupled to the divisor input of another programmable divider 94 which performs still another portion of the calculations required to solve the above-indicated equation. In particular, the output of oscillator 84, which is 20 MHZ in this example, is transmitted to the input of programmable divider 94 through still another programmable divider 96. The divisor input 36' of divider 96 is controlled by the previously described divisor selector thumbwheel switch 36 into which the meter standard factor (MS) has been manually set. Accordingly the output of programmable divider 96 is a pulse train having a frequency equal to 20 MHZ divided by the meter standard factor which frequency is transmitted to divider 94. The output of divider 94 is then a pulse train having a frequency equal to 200 × (BSFC)/(MS) owing to the divisor which has been set into divider 94 as previously described.

The output of programmable divider 94 is coupled to another decade counter 97 through a NAND gate 98 which has a pair of gating inputs coupled to the outputs of monostable multi-vibrators 90 and 91 respectively. Multivibrator 90 has a period of one second as previously described while multivibrator 91 has a six-second period. Consequently, NAND gate 98 is enabled for a period of five seconds following completion of the above-described count at counter 88. Thus a count is stored in decade counter 97, six seconds after the intrument Reset switch 31 has been closed, that is equal to 1000 (BSFC)/(MS).

The output of decade counter 97 is coupled to the divisor input of still another programmable divider 103 which has a dividend input coupled to the 20 MHZ output of oscillator 84. Thus the output of divider 103 is a pulse train having a frequency equal to 20,000 (MS)/(BSFC).

To perform still another portion of the computations required for solving the above-identified equation, the output of divider 103 is coupled to the multiplicand input of a multiplier 104. The multiplier input of multiplier 104 is coupled to divisor selector 37' of switch 37 which, as previously described, is manually set to select the number (MC) of revolutions of the fuel flowmeter which are to be utilized in the test. Accordingly, the output of multiplier 104 is a pulse train having a frequency equal to 2000(MC)(MS)/(BSFC).

This multiplication completes the precomputation phase of operations since the final steps needed to determine engine horsepower are division of this frequency by a factor (TT) indicative of the time required to consume the predetermined amount of fuel in the engine and then counting of the resulting pulse train for a predetermined amount of time selected to provide read-out in terms of desired units such as Brake Horsepower. Unlike the other factors which have been entered into the precomputations as described to this point, the test time (TT) is not known in advance and thus the final division must await completion of the fuel consumption time count by means which will hereinafter be described. However, the components which perform the final portion of the computation after the test time factor has been determined include another programmable divider 106 having an input coupled to the output of multiplier 104 and having an output coupled to a decade counter 107 through an AND gate 108 and an OR gate 109 the functions of which will be hereinafter described. This allows the result of the division by test time to be counted and stored by counter 107. Counter 107 has an output coupled to a bistable latching circuit 111 in which the result of the computation is stored in BCD form at the completion of the computation. Latching circuit 111 is in turn coupled to visual display 32 through a decoder and driver 112 which converts the data to decimal form for visual display at read-out 32.

Considering now the computation circuitry which determines the test time factor (TT) for the final division described above, the output of timing pulse source divider 86c, 100 HZ in this example, is coupled to the above-described decade counter 107 through a four input AND gate 113 and then through the previously described OR gate 109. AND gate 108 is held disabled while test time is being measured by means to be hereinafter described and thus the output of programmable divider 106 is not received by counter 107 during that period. Consequently counter 107 may be utilized during that period to store a count indicative of test time (TT). The period during which counter 107 counts timing pulses for this purpose is controlled by AND gate 113. In addition to a timing pulse input as described above, AND gate 113 has another input coupled to the output of a Start-of-Test JK flip-flop 114, another input coupled to an inverted (not set) output of an End-of-Test JF flip-flop 116 and still another input coupled to an inverted output of a Void Test JK flip-flop 117. Accordingly AND gate 113 is enabled, to permit counting of test time pulses at counter 107, only after Start-of-Test flip-flop 114 has been set and the count will be terminated when End-of-Test flip-flop 116 is set or if Void Test flip-flop 117 should be set prior to setting of flip-flop 116.

Considering now the means which control the flipflops 114, 116 and 117, Start-of-Test flip-flop 114 is set, to begin the time count, when engine speed reaches the preselected speed at which the test is to be conducted as established by the manual setting of RPM selector switch 34 which controls the divisor input of a programmable divider 118. The engine speed pulse conductor 26 is coupled to the input of a pulse shaper and frequency doubler 119 which has an output coupled to the input of programmable divider 118. The output of programmable divider 118 is coupled to the trigger input of Start-of-Test flip-flop 114. Accordingly flip-flop 114 will be set to begin a fuel consumption rate count when an output signal appears at programmable divider 118. In the absence of further provisions, this output signal would appear after the divider 118 had received a number of speed pulses from pulse shaper 119 equal to the divisor which had been set into divisor selector 34'. The output signal does not in fact appear until a predetermined engine speed is reached, since the reset input of divider 118 is coupled to the 3⅓ HZ output of time pulse source divider 86f through an OR gate 120. The other input of OR gate 120 is coupled to the Reset pulse source 83'. Consequently, divider 118 is reset at the beginning of the power measurement, to remove any accumulated count in the divider, by the operation of Reset Switch 31 which starts the measurement. Divider 118 is then periodically again reset, every third of a second in this example, by the timing pulses from divider 86f. This means that no output appears from divider 118 until the rate at which engine speed pulses are generated by tachometer 23 reaches a level, determined by the setting of RPM selector thumbwheel switch 34, at which a number of pulses at least equal to the divisor setting are received within one-third of a second. When that engine speed is reached, an output signal is produced by the divider 118. This sets Start-of-Test flip-flop 114 which in turn enables gate 113 to cause the desired test time count to begin at counter 107.

In order to disable gate 113 when a predetermined known quantity of fuel has been consumed by the engine and thereby stop the test time count at counter 107, fuel consumption pulses from flowmeter 13, after shaping in pulse shaper 86, are transmitted to the input of another programmable divider 121 through an AND gate 122. The enable input of AND gate 122 is coupled to the output of Start-of-Test flip-flop 114 so that divider 121 does not begin to receive fuel pulses until the preselected engine speed has been realized and the test time count is to start. The divisor input of divider 121 is coupled to a divisor selector 37' controlled by the meter revolutions thumbwheel switch 37. Thus divider 121 will produce an output pulse after a number of fuel pulses have been received equal to the number of flowmeter revolutions which were selected to be utilized in the test. The output of divider 121 is coupled to the trigger input of End-of-Test flip-flop 116 through another divider 123. Divider 123 has a preset divisor equal to the number of fuel pulses produced per revolution by the particular flowmeter 13 used in the test, this being 720 pulses per meter revolution in the present example of the invention. Consequently, divider 123 produces an output signal, to set End-of-Test flip-flop 116, after a number of fuel pulses have been generated equal to the number of fuel pulses produced per meter revolution multiplied by the number of meter revolutions which were selected for the test.

The setting of End-of-Test flip-flop 116 disables gate 113 stopping the timing pulse count at counter 107. This count, now stored in latching circuit 111, is indicative of the time required to consume the predetermined known amount of fuel in the engine undergoing test. The output of latching circuit 111 is coupled to the divisor input of programmable divider 106 so that divider 106 may perform the final division by test time (TT) as previously described. It may be observed that this test time is temporarily displayed at read-out 32 at this stage of operation owing to the connection between latching circuit 111 and the read-out through decoder driver circuit 112.

If the load on the engine should vary during the interval that test time is being evaluated, a voltage appears on conductor 78 as previously described. Conductor 78 is connected to the trigger input of Void Test flip-flop 117. Thus the load variation sets flip-flop 117 which then disables gate 113 to stop the time count in progress at counter 107. Test Void indicator lamp 46 is connected between a noninverted output of flip-flop 117 and ground and is therefore lighted when the load variation occurs. Engine at Full Load Lamp 42 may be connected between the inverted output of flip-flop 117 and ground. Test in progress indicator lamp 45 may be connected between the output of AND gate 113 and ground.

Upon completion of the measurement of test time, signaled by the setting of End-of-Test flip-flop 116, it is necessary to clear the test time count from counter 107 and to enable gate 108 so that the same counter 107 may count output pulses from divider 106 for a predetermined interval to complete the horsepower calculation. For this purpose, the noninverted output of End-of-Test flip-flop 116 is connected to one input of an AND gate 124 which has an output connected to the trigger input of a Start-of-Computation JK flip-flop 126. The other input of AND gate 124 is coupled to the output of timing pulse source divider 86e which produces a 1 HZ frequency in this example. Thus gate 124 transmits a 1 HZ pulse train provided End-of-Test flip-flop 116 is set. The first one-second timing pulse transmitted through gate 124, following setting of End-of-Test flip-flop 116, sets Start-of-Computation flip-flop 126. The output of flip-flop 126 is coupled to one input of AND gate 108. The output of gate 124 is also coupled to the trigger input of an End-of-Computation JK flip-flop 127 through a divider 128 which is a divide-by-six divider in this example. Accordingly End-of-Computation flip-flop 127 is set a predetermined interval after the setting of the Start-of-Computation flip-flop 126, the interval being 5 seconds in this example. An inverted output of flip-flop 127 is coupled to one input of AND gate 108.

Accordingly gate 108 is enabled to transmit the output of divider 106 to counter 107 upon setting of the Start-of-Computation flip-flop 126 and is then disabled a predetermined interval later upon setting of End-of-Computation flip-flop 127, the interval being five seconds in this example. Counter 107 then stores a count equal to:

$$10,000(MS)(MC)/(BSFC)(TT)$$

which is the solution of the equation hereinbefore given and which is the horsepower output of the engine undergoing test. This count is stored in latching circuit 111 and displayed at read-out window 32 after conversion from BCD to decimal numbers by decoder and driver circuit 112.

Latching circuit 111 does not receive new data from the counter 107 after the test time count has been completed, as signaled by setting of End-of-Test flip-flop 116, since the latching circuit must hold the counted test time as a divisor input to divider 106 during the period that counter 107 is being used to count the output pulse train from divider 106. Similarly, the counter 107 must be reset at the completion of the test time count in order to begin the subsequent power evaluation count. Latching circuit 111 must then be momentarily enabled following the end of the final computation, as signaled by setting of End-of-Computation flip-flop 127 so that the results of the completed horsepower computation will be displayed at readout 32.

Considering now suitable circuit components for this purpose, the enabling pulses are transmitted to latching circuit 111 through an OR gate 136 which has one input coupled to the inverted or reset output of End-of-Test flip-flop 116. The other input of OR gate 136 is coupled to the non-inverted or set output of End-of-Computation flip-flop 127 through a monostable multivibrator 134. The noninverted output of End-of-Test flip-flop 116 is coupled to the input of a monostable multi-vibrator 132 which has an output coupled to the reset input of counter 107 through an OR gate 133. Multi-vibrator 132 provides a brief delay in the resetting of counter 107 to assure that the resetting occurs only after it has been isolated from latching circuit 111. The other input of OR gate 133 is the instrument reset signal source 83'.

Thus when End-of-Computation flip-flop 127 is set, the test time count previously stored in latching circuit 111 and decoder driver 112 and which was displayed at read-out window 32, is cleared and a new number is received from counter 107 and displayed at the readout window 32 to indicate the power output of the engine undergoing test.

Indicator lamp 47 is connected between an inverted output of flip-flop 127 and ground to visually indicate when any number then being displayed at read-out 32 represents elapsed seconds in the test period. Indicator lamp 48 is connected between the non-inverted output of flip-flop 127 and ground to indicate when read-out 32 shifts to a display of calculated horsepower.

It is useful in conducting the power evaluation and for diagnosis of an engine in general, if a visual display of engine speed in terms of RPM is available, the additional read-out 33 being provided in the present instrument in part for this purpose. Read-out window 33 is also utilized to display a count of fuel pulses when the Reset switch 31 is closed so that it may be ascertained if the flowmeter 13 is working properly. For this purpose, the output of engine speed pulse shaper and doubler 119 is connected to the input of a decade counter 138 through a NAND gate 139 and an OR gate 141. The other input of NAND gate 139 is coupled to the reset signal junction 81 so that the NAND gate is disabled from transmitting engine speed pulses to counter 138 if reset switch 31 is held closed. Counter 138 otherwise counts the engine speed pulses for a predetermined period which is selected so that the count at the completion of the period is representative of engine speed in terms of revolutions per minute. This period, during which fuel pulses must be counted to produce a count in terms of RPM, is determined by the rate of revolution of toothed wheel 68 in relation to that of the engine crankshaft, by the number of pulse-producing teeth on wheel 68 and by the multiplication of the speed pulses, if any, which occurs between the tachometer 23 and counter 138, this multiplication being a doubling within a pulse-shaper 119 in the present example of the invention. As toothed wheel 68 is coupled to an engine camshaft, in this example of the invention, which turns at one-half the rate of the engine crankshaft and has twenty teeth, speed pulses are produced on conductor 71 at the rate of ten per engine crankshaft revolution. These ten pulses per revolution are then doubled to twenty pulses per revolution in pulse-shaper 119. Accordingly, to obtain a count in terms of crankshaft revolutions per minute, counter 138 counts for a period of 3 seconds in this example. The output of counter 138 coupled to the input of a latching circuit 142 which has an output coupled to a decoder and driver circuit 143 coupled to the display read-out 33. Thus, after three seconds, read-out 33 displays engine speed in RPM. At the conclusion of each 3 seconds, counter 138 and latching circuit 142 are reset and begin another engine speed pulse count which then replaces the original count at read-out window 33 and this process of redetermining engine speed is repeated every 3 seconds. To provide for resetting every 3 seconds, clock pulses from the final divider 86g of the timing pulse source, having a frequency of one-third HZ in this example, are transmitted to the input of a monostable multi-vibrator 146. The output of multi-vibrator 146 is connected to the reset input of counter 138 and the enabling input of latching circuit 142 through an OR gate 147 and through another monostable multi-vibrator 148 in the case of the counter 138 in particular to assure that the brief enabling of the latching circuit precedes resetting of the counter. The other input of OR gate 147 is connected to the instrument reset pulse source 83'. RPM signal indicator lamp 43 may be connected between the output of NAND gate 139 and ground to indicate when engine speed is being displayed at read-out 33.

To use read-out window 33 for the purpose of checking operation of flowmeter 13, Reset switch 31 is closed. This stops the transmission of engine speed pulses to counter 138 and causes fuel pulses from pulse shaper 86 to be transmitted to the counter 138 instead while the Reset switch 31 remains closed. Under this condition, fuel pulse counts appear at read-out 33 indicating operation of the flowmeter. Circuit components for this purpose include an AND gate 151 having one input coupled to reset signal junction 81 and having another input coupled to the output of pulse shaper 86. The output of AND gate 151 is coupled to an input of OR gate 141 leading to counter 138. Thus upon closing of the Reset Switch 31, AND gate 151 is enabled to transmit fuel pulses to counter 138 thereby causing a fuel pulse count to be displayed at read-out 33. Indicator lamp 44 may be connected between junction 81 and ground to indicate that a meter signal count is currently being displayed. The transmission of engine speed counts to counter 138 is temporarily blocked, while the reset switch remains closed, as on input of NAND gate 139 is also coupled to the reset signal junction 81.

It will be appreciated by those skilled in the art that the basic calculations required in the instrument may be performed by arrangements of computation circuit elements which differ in some respects from the specific example described above. The power computation in its most generalized form is a multiplication of the engine specific fuel consumption factor by flow rate of fuel into the engine. Flow rate may be defined as quantity of fuel divided by time and in the present instance the quantity of fuel to be employed in the test is set in advance so that time (to consume that quantity of fuel) is the variable which is measured by the instrument. The precomputations performed before the time measurement has been completed are thus basically a multiplication of Specific Fuel Consumption factor by a predetermined fuel quantity and by constants of proportionality where necessary. In the example herein described, dividers are used in part to perform what is basically a multiplication operation. This is possible since division of one value by the reciprocal of another is, as a practical matter, equivalent to multiplication of the two values. Conversely, division can be performed by multiplying one value by the reciprocal of another. Thus equivalent circuit arrangements may be made in which multipliers are substituted for dividers and vice versa. Similarly, the instrument herein described enables use of meters of different flow capacity for different-sized engines since the meter standard factor (MS) may be selectively changed as necessary and also allows the operator to select the quantity of fuel which is to be used as a basis for the test by providing for manual selection of the number of meter revolutions (MC) to be used in the computation. In general, more accurate results are obtainable by increasing the number of meter revolutions but this must be balanced against the increased risk of voiding of the test results from a load variation where the test time is longer. It will be apparent that if the same meter is always to be used with the instrument and the same quantity of fuel is always to be employed in the test, the computation circuit may be simplified as these factors may then be permanently fixed in the circuit. If the meter revolutions factor (MC) is always to be one, for example, programmable divider 121 and associated components may be eliminated.

Thus, while the invention has been described with respect to a single exemplary embodiment, it will be apparent that many variations are possible and it is not intended to limit the invention except as defined in the following claims.

What is claimed is:

1. Apparatus for determining the power output of an engine comprising:
    a flowmeter having means for producing fuel flow electrical signals indicative of fuel flow into said engine;
    a source of timing signals;
    a start-test switch;
    test time determining means responsive to said fuel flow signals and said timing signals for measuring and temporarily storing a test-time value indicative of the time required for passage of a predetermined quantity of fuel through said flowmeter following operation of said start-test switch;
    precomputation means for multiplying the Specific Fuel Consumption factor of said engine by said predetermined quantity in response to operation of said start-test switch and prior to completion of said determination of said testtime value to produce a precomputation value representing the product of said Specific Fuel Consumption factor and said fuel quantity; and
    final computation means for dividing said precomputation value by said time value to produce a power value indicative of engine power output.

2. Apparatus as defined in claim 1 further comprising means for producing speed signals indicative of the speed of said engine, and means for delaying operation of said test time determining means until said speed signal reaches a value indicative of a predetermined engine speed.

3. Apparatus as defined in claim 2 further comprising engine speed display means for visually indicating said speed of said engine in response to said speed signal.

4. Apparatus as defined in claim 3 further comprising means for temporarily decoupling said engine speed display means from said speed signal producing means while temporarily said engine speed display means to said fuel flow signal producing means.

5. Apparatus as defined in claim 1 further comprising means for producing a load variation signal when the load on said engine varies, and means for stopping operation of said test time determining means when said load variations signal departs from a predetermined value.

6. Apparatus as defined in claim 1 further comprising calculated power display means for visually indicating said power value, first gate means for coupling said power display means to said test time determining means following operation of said start-test switch to cause said power display means to initially display said test time value, second gate means for coupling said power display means to said final computation means to cause said power display means to subsequently display said power value, and means for disabling said first gate means while enabling said second gate means in response to completion of computation of said power value by said final computation means.

7. Apparatus as defined in claim 1 wherein said precomputation means comprises:
    a first programmable divider having an input coupled to said source of timing signals and having an output;
    first divisor selector means for setting a selected divisor into said first programmable divider which divisor is selected to correspond to said Specific Fuel Consumption factor of said engine;
    a first pulse counter having an input and an output; and
    first gate means for coupling said output of said first programmable divider to said input of said first pulse counter for a predetermined period of time following operation of said start-test switch to cause said first counter to store a count representing said Specific Fuel Consumption factor.

8. Apparatus as defined in claim 7 further comprising:
    a second programmable divider having an input coupled to said source of timing signals and having an output;
    second divisor selector means for setting a selected divisor into said second programmable divider, which divisor is selected to correspond to said predetermined fuel quantity;
    a third programmable divider having an input coupled to said output of said second programmable divider and having a divisor terminal coupled to said output of said first pulse counter and having an output;
    a second pulse counter having an input and an output; and
    second gate means for coupling said output of said third programmable divider to said input of said second pulse counter for a predetermined period of time following operation of said first gate means to cause said second counter to store a count representing said Specific Fuel Consumption factor divided by said predetermined fuel quantity.

9. Apparatus as defined in claim 8 wherein said flowmeter is a rotary flowmeter and said predetermined quantity of fluid is the amount of fluid which passes through said meter in one revolution multiplied by a meter cycles factor which is the number of meter revolutions selected for said test, further comprising:
third divisor selector means for generating a signal representing said meter cycles factor;
a fourth programmable divider having an input coupled to said source of timing signals and having a divisor terminal coupled to said output of said second pulse counter and having an output; and
a multiplier having one input coupled to said output of said fourth programmable divider and having another input coupled to said third divisor selector means to cause said multiplier to have an output pulse frequency indicative of said quantity of fuel passed by said meter per revolution multiplied by said meter cycles factor divided by said Specific Fuel Consumption factor.

10. Apparatus as defined in claim 9 further comprising:
a fifth programmable divider having an input coupled to said output of said multiplier and having a divisor terminal coupled to said test time determining means and having an output;
a third pulse counter having an input and an output; and
third gate means for coupling said output of said fifth programmable divider to said input of said third pulse couner for a predetermined period of time following operation of said test time determining means to cause said third counter to store a value indicative of said power output of said engine.

11. Apparatus for computing the power output of an internal combustion engine comprising:
a fluid flowmeter having means for connection into the fuel flow path of said engine and having means for producing output fuel pulses at a frequency proportional to the rate of fuel flow through said path;
a timing pulse source having means for producing timing pulses of predetermined frequency;
a precomputation circuit having means for dividing said timing pulse frequency by a value corresponding to the Specific Fuel Consumption factor of said engine and by a value corresponding to a predetermined quantity of fuel to produce a precomputation circuit frequency;
fuel pulse counter means coupled to said flowmeter and said timing pulse source for counting and storing a value indicative of the time required for production of a predetermined number of said fuel pulses by said flowmeter and having means for producing a completion of count signal;
a final computation circuit having means activated by said completion of count signal for dividing said precomputation circuit frequency by said time value to produce final computation pulses having a final computation frequency;
means for counting said final computation pulses for a predetermined period of time to produce a final count that corresponds to said engine power output; and
means for indicating said final count.

12. Apparatus as defined in claim 11 further comprising a tachometer having means for connection to a rotating element of said engine and having output means for producing engine speed pulses at a frequency proportional to the speed of said engine, a start-count gate control means for producing a start-count signal when said speed pulse frequency reaches a predetermined value, and a startcount gate connected between said flowmeter and said fuel pulse counter for blocking transmission of said fuel pulses to said fuel pulse counter in the absence of said start-count signal.

13. Apparatus as defined in claim 12 wherein said start-count gate control means comprises a flip-flop circuit having an output which changes state in response to a set pulse at an input, said output being coupled to said startcount gate to enable said gate in response to said set pulse, a speed pulse frequency divider connected between said tachometer output and said flip-flop circuit input and having divisor means for causing a set pulse to be transmitted to said flip-flop circuit only after a predetermined number of said speed pulses have been received, and reset means connected between said timing pulse source and said divider for periodically delivering a reset pulse to said divider whereby a set pulse is transmitted to said flip-flop circuit only if said tachometer output frequency is at least equal to a predetermined value.

14. Apparatus as defined in claim 13 further comprising divisor means coupled to said precomputation circuit for selectively changing said value corresponding to said Specific Fuel Consumption factor to enable said apparatus to be used with different engines, and means for selectively adjusting said predetermined frequency value at which said start-count gate control means produces said start-count signal to enable selection of the engine speed at which said power output is determined.

15. Apparatus as defined in claim 14 further comprising:
means for varying said predetermined quantity of fuel by a selectable factor,
means for dividing said fuel pulse frequency by said selectable factor; and
means for dividing said precomputation circuit frequency by said selectable factor.

* * * * *

UNITED STATES PATENT AND TRADEMARK OFFICE
CERTIFICATE OF CORRECTION

PATENT NO. : 3,975,952
DATED : August 24, 1976
INVENTOR(S) : THOMAS F. LACHER, JR. ET AL It is certified that error appears in the above-identified patent and that said Letters Patent are hereby corrected as shown below:

Column 14, line 13, --coupling-- should be inserted after "temporarily".

Signed and Sealed this

Twelfth Day of April 1977

[SEAL]

Attest:

RUTH C. MASON
Attesting Officer

C. MARSHALL DANN
Commissioner of Patents and Trademarks